Dec. 28, 1943.  F. W. JOBE ET AL  2,337,898
PHOROMETER
Filed Sept. 13, 1941  3 Sheets-Sheet 2

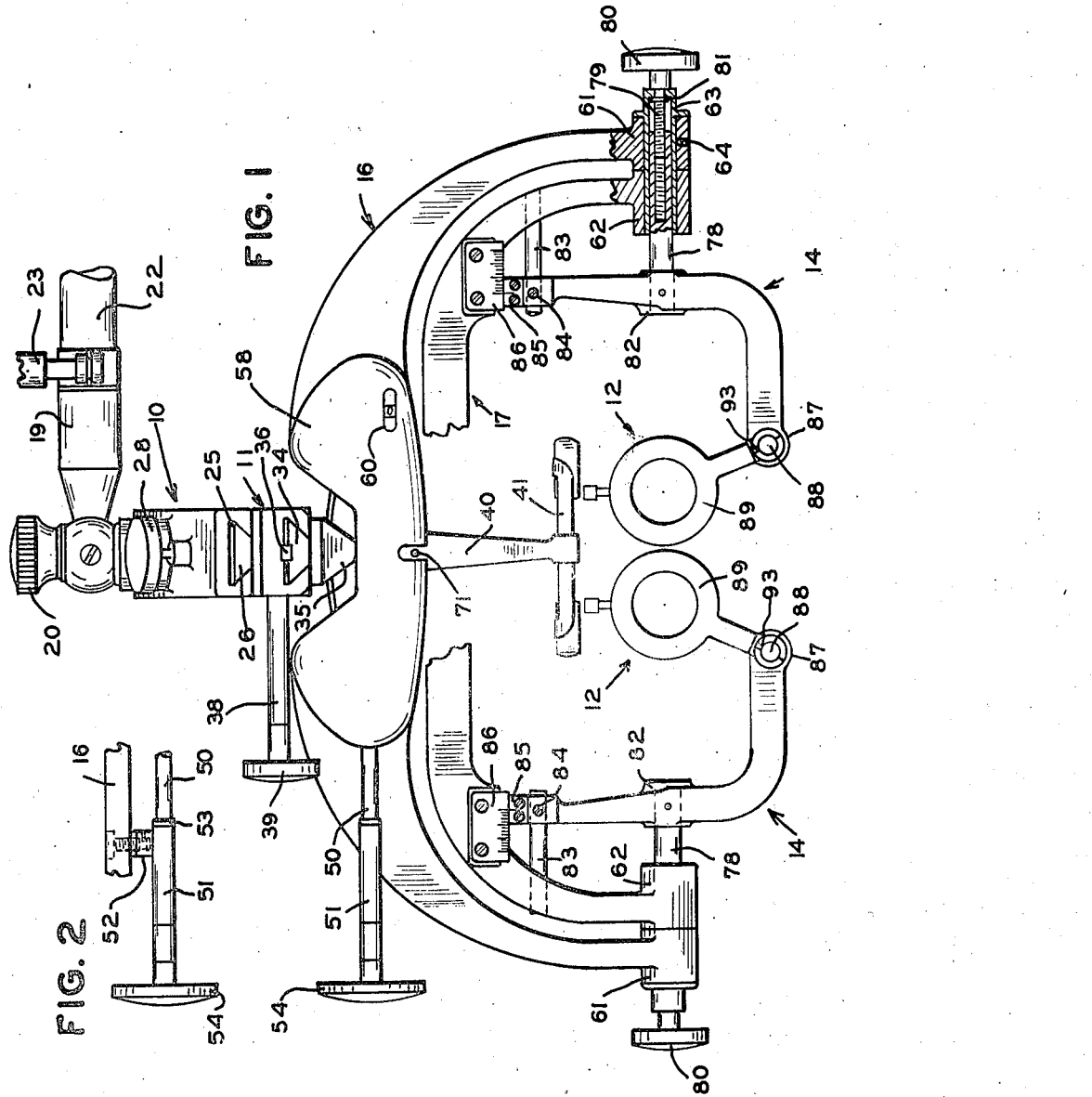

FREDERICK W. JOBE
RAYMOND F. E. STEGEMAN
INVENTORS
BY
ATTORNEYS

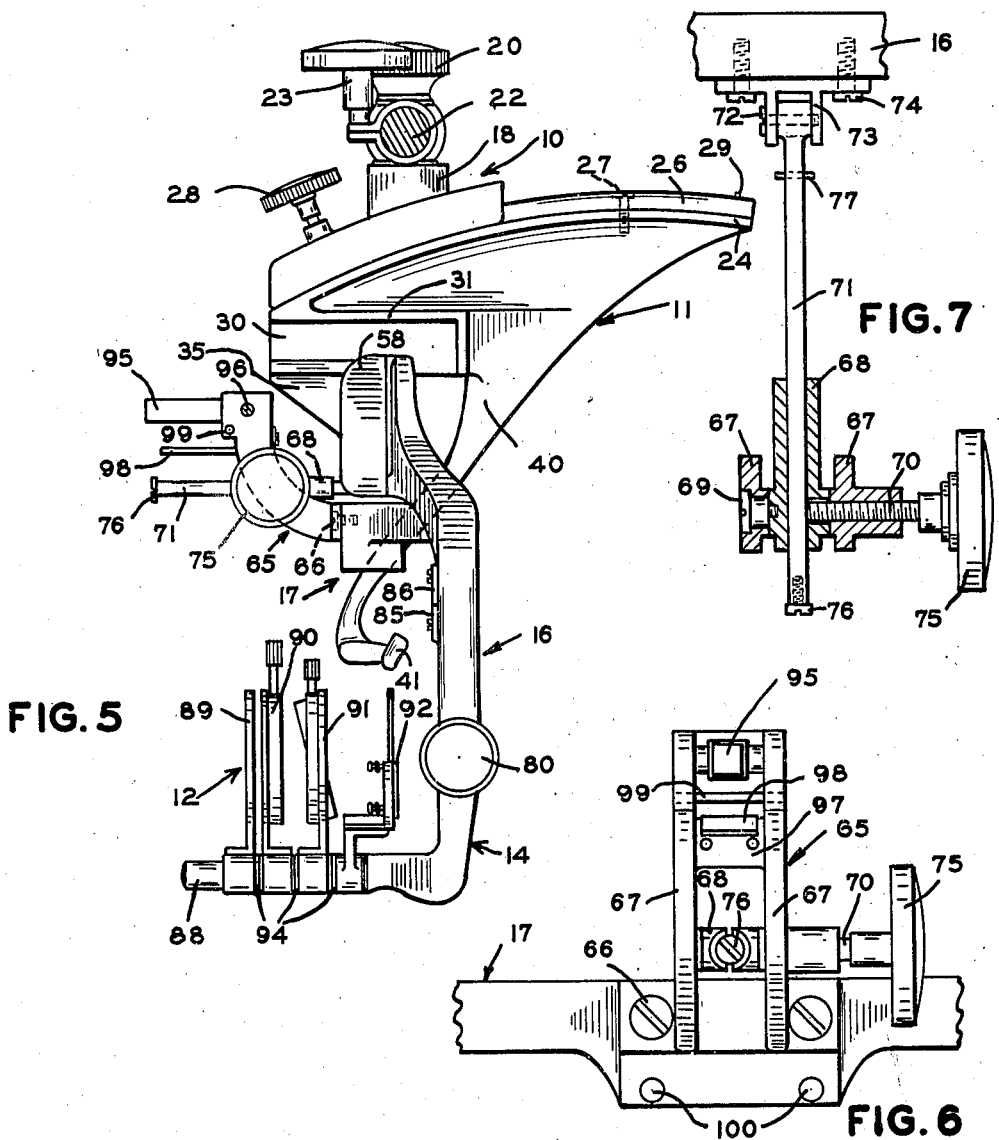

Patented Dec. 28, 1943

2,337,898

UNITED STATES PATENT OFFICE 2,337,898

PHOROMETER

Frederick W. Jobe, Brighton, and Raymond F. E. Stegeman, Rochester, N. Y., assignors to Bausch & Lomb Optical Company, Rochester, N. Y., a corporation of New York Application September 13, 1941, Serial No. 410,754

7 Claims. (Cl. 88—20)

The invention relates to eye testing apparatus and more especially is concerned with that class of ophthalmological instruments known as phorometers.

An important object of the invention resides in the provision of eye testing apparatus which permits the correct location of the optical eye testing elements for carrying out an eye test, another object being to mount the optical elements so that they may be tipped from a position wherein their optical axes are substantially horizontal to a position wherein their optical axes are inclined to the horizontal.

Other objects of the invention are to devise means in a phorometer for moving its optical eye testing elements towards and away from a patient's face; to provide for the leveling of the optical elements by tilting them about a center point located substantially midway between the eyes; to employ separate pupillary distance adjustments for positioning the optical elements of the instrument before each eye; to devise a mounting for the optical elements which permits them to be separately swung to inoperative and out of the way positions and in general to provide an instrument of a simple design which lends itself to incorporation in a device of easy manipulation and rugged construction.

With these and other objects in view, which may be incident to the improvements, the invention consists in the parts and combinations to be hereinafter set forth and claimed, with the understanding that the several necessary elements comprising the invention may be varied in construction, proportion and arrangement without departing from the spirit thereof or without exceeding the scope of the appended claims.

In order to make the invention more clearly understood there is shown in the accompanying drawings means for carrying the same into practical effect without limiting the improvements in their useful applications to the particular constructions which, for the purpose of explanation, have been made the subject of illustration.

With reference to the drawings:

Figure 1 is a front elevation of the improved phorometer and shows the instrument partially in section and with certain parts thereof broken away.

Figure 2 is a partial and broken away plan view of the apparatus of Figure 1 and discloses the mounting for the operating shaft employed to actuate the leveling or tilt adjustment.

Figure 5 is a side elevation of the instrument.

Figure 6 is a partial front elevation of the instrument and illustrates in detail the parts of the device omitted in the broken away elevation shown in Figure 1.

Figure 7 is a broken away plan view, partially in section, of connecting means between the frames of the instrument.

Figures 3, 4:
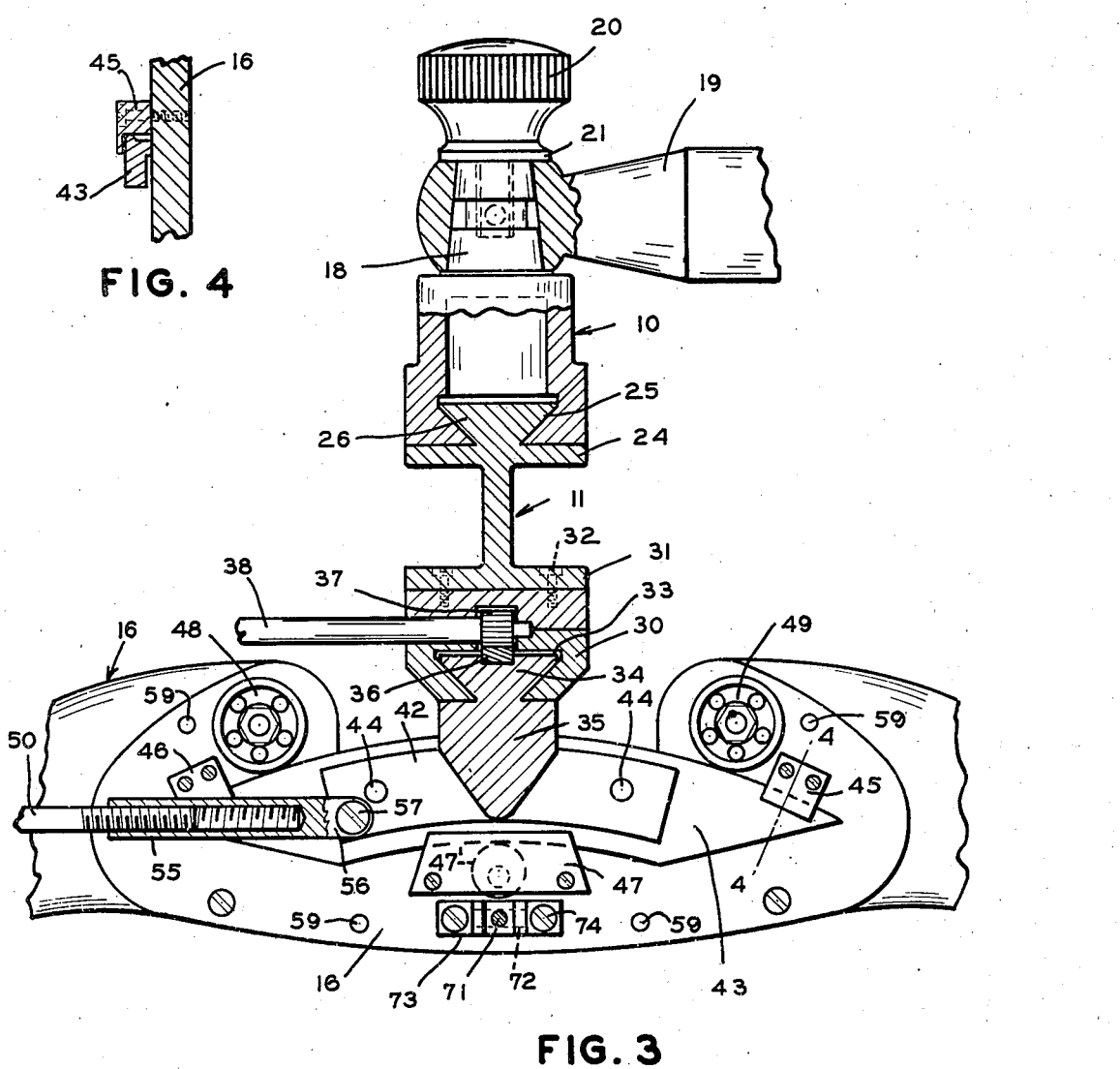
Figure 3 is an enlarged partial elevation similar to Figure 1 but with other parts thereof in section and with the cover for the tilting mechanism removed.
Figure 4 is a partial sectional view taken on the line 4—4 of Figure 3.

Like reference characters are used throughout the several views of the drawings to indicate similar parts of the improved phorometer, the main operating elements of which comprise a support in the form of a block 10, frame bracket 11 movably mounted on the support block 10 and adapted to carry optical eye testing elements 12 mounted on arms 14 which latter are carried by frames 16 and 17 in turn carried by the bracket 11. These just mentioned parts of the instrument are generally indicated by the reference numerals noted.

Instruments of the character set forth are adapted to be mounted upon a suitable stand. To this end, the upper surface of the support block 10 is provided with a stud 18 which forms a pivot upon which the mounting arm 19 is carried. A clamp button 20 having a threaded shank is engaged with the stud 18 as shown in Figure 3 so that in combination with the washer 21 surrounding the shank it may be utilized to clamp the support 10 in a desired position with respect to the arm 19.

Mounting arm 19 is provided with a hollow portion which forms means for mounting the phorometer on its stand. While not entirely shown in the drawings, the usual phorometer stand makes use of an upright to which a bracket arm 22 is pivoted for movement in a horizontal plane. In the usual construction of this type, the bracket arm 22 is also vertically movable with respect to the stand so that the instrument mounted thereon may be adjusted to a desired elevation. The hollow portion of the mounting arm 19 is adapted to receive the bracket arm 22 and to be secured thereto by any conventional clamp means such as that indicated by the numeral 23 in Figures 1 and 5. It is to be noted that when the phorometer is mounted upon its stand, the mounting arm 19 is positioned so that its longitudinal axis is substantially horizontal. This permits the support 10 to be rotated about a pivot axis which is substantially vertical.

As best shown in Figure 5, the support block 10 is of arcuate shape in a lengthwise direction and so also is the upper surface or the upper flange 24 of the flanged portion of the frame bracket 11. This construction is designed to permit the frame bracket to be slidably mounted on the relatively fixed support 10 for movement in an arcuate path. One manner of effecting the sliding connection between the bracket 11 and support block 10 makes use of an arcuate track in the form of dovetail guide means 25 provided in the lower surface of the support 10 to extend from end to end thereof. This track is adapted to cooperatively enagage arcuate slide means such as the arcuate shaped slide 26 which extends lengthwise of the flange 24 of bracket 11 and which is secured thereto by fastening means 27.

Clamp means, designated in general by the numeral 28, are employed to secure the frame bracket 11 in adjusted position with respect to the support 10. These clamp means comprise a conventional clamp device, not shown but mounted within the guide 25, which is actuated by a screw extending through the support 10 and provided with the usual operating button as disclosed. If desired, conventional stop means 29 may be provided at the ends of the slide 26 and also within the guide 25 for controlling the movement of the frame bracket. It will be apparent that the guide and slide means may be interchanged so that the slide is provided on the support block 10 and the guide in the frame bracket 11. Also within the spirit of the invention is the formation of the guide and slide means on the sides of the support block 10 and the web of the flanged portion of the bracket 11.

By maintaining the axes of the mounting arm 19 and the pivot 18 respectively horizontal and vertical, it will be appreciated that the frame bracket 11 is mounted for arcuate movement in a vertical plane. In other words, the frame bracket moves in an arcuate path about a horizontal axis which extends transversely thereof as well as transversely of the support block 10. The curvature of the slide and guide means or the radius of the arcuate path through which the frame bracket 11 is moved is given a length which substantially equals the distance from the top of the average human head to an axis about which the head is tipped for reading purposes while the length of the arcuate path itself is made at least equal to the average arcuate distance through which a person moves the head when tipping it from a normal position for far vision to a normal position for near vision when assuming a reading posture.

Inasmuch as the arcuate tipping movement of the frame bracket is transmitted to the frames 16 and 17 and from them to the optical eye testing elements 12, it will be apparent that the latter will be moved in an arcuate path in accordance with the movement of the frame bracket. As will more fully appear, the tipping movement of the optical elements 12 allows them to follow the movement of the head in a vertical plane and hence will greatly increase the accuracy with which an eye test may be conducted as the optical elements are maintained in a centered relation to the head.

To assist in adjusting the instrument towards and away from the face of a patient, use is made of a guide block 30 secured to the lower flange 31 of the frame bracket 11 by fastening means 32. As shown in Figures 3 and 5, guide block 30 is of a general rectangular shape and is positioned so that its long dimension lies lengthwise of the bracket 11. The guide block 30 is formed with flat surfaces, the upper one of which is seated against the flat lower surface of the flange 31. A suitable guideway 33 having a straight line longitudinal axis is provided in guide block 30 to extend lengthwise thereof. Cooperatively engaged in this guideway is the dovetail slide portion 34 of the slide member 35 which latter is employed in connecting the frames 16 and 17 to the bracket 11.

A conventional construction employing rack and pinion means is used for moving the slide member 35. These means comprise the rack 36 on the slide 34 and the pinion 37 fixed on the shaft 38 which latter is journalled in the guide block 30 and which is rotated by the actuating button 39. Appropriate rotation of pinion 37, which is in driving engagement with rack 36, will cause desired movement of slide member 35. It may be observed that the straight line movement of the slide member 35 is independent of the arcuate tipping movement of the bracket 11 although this latter movement is transmitted to the slide member 35 as this member is mounted on the bracket in a manner which will cause it to tip therewith. As the frame 16 is secured to the slide member 35 it will be apparent that the optical elements 12 carried by the frame will be moved towards or away from the bracket 11 as the slide member 35 is adjusted along its slide.

The frame bracket 11 is provided with a depending portion or arm 40, the upper end of which forms an abutment which limits the movement of the slide member 35 towards the bracket. Arm 40 also serves as a support for a forehead rest 41 which is secured to the lower end thereof. A suitable stop, not shown, may be provided to control the slide member 35 in its movement away from the frame bracket so as to maintain its slide 34 in the guideway 33.

Cast or otherwise secured to the slide member 35 to extend transversely thereof is a connection member 42. An arcuate shaped track 43 is fastened to the connection member by screws 44 and is so located that it also extends transversely of the slide member 35 and has one of its sides in contact with a side of the member 42 and its arcuate edges extending beyond the edges of the connection member. This track provides a means for mounting the frame 16 transversely of the frame bracket 11 so that the frame and the optical elements carried thereby may be tilted for leveling purposes. The tilting movement just mentioned, as will more fully appear, takes place about a center located substantially on the rotational axis of the eyes and positioned substantially midway between the eyes of a patient who is undergoing test.

Frame 16 is given a distorted U shape in that it is provided with a relatively long main portion having short projecting arms. In mounting frame 16 on track 43, use is made of gibs 45, 46 and 47 and the ball bearing assemblies 48 and 49 all secured to the frame in the manner shown. Frame 16 is supported by its ball bearings which travel on the edge of track 43. Gibs 45 and 46 engage the side of the track as detailed in Figure 4 to hold the frame against the back of the track. Gib 47 similarly engages the side of the track. In back of gib 47 is an adjustable eccentric 47', the shaft of which is adjustably journalled in frame 16. Eccentric 47' contacts the lower edge of track 43 to maintain both ball bearings in contact with the track. It is to be noted that tilting movement of frame 16 occurs on an axis which is substantially at 90° to the tipping axis of bracket 11. When frame 16 is positioned as in Figure 1, the tilting axis will lie in a substantially horizontal plane.

Means for adjusting the position of the frame 16 on the track 43 comprise a tilt screw 50, the unthreaded shank of which extends through and is journaled in a bearing 51 secured to the frame 16 by fastening means 52 such as those illustrated in Figure 2. Tilt screw 50 has a collar 53 secured to its unthreaded portion adjacent one end of the bearing 51 and an actuating button 54 secured thereto adjacent the other end of the bearing. The threaded end of the tilt screw 50 is engaged with an internally threaded joint member 55 which acts as nut and which is provided with a flattened portion 56 at its end away from the tilt screw. Flattened portion 56 is pivotally connected to the connection member 42 by threaded means 57. Obviously, suitable rotation of the button 54 will cause movement of the frame 16 so that it may be leveled.

The tilt mechanism is enclosed within a suitable housing 58 which is secured to the frame 16 by screws 59 and is consequently movable with the frame. Housing 58 has a level 60 secured thereto for ready observation. Suitable securing means, not shown, are employed for mounting the level on the housing. Level 60 is so located with respect to the frame 16 that the position of its bubble will indicate when the phorometer is properly leveled.

As may be observed, the inner frame 17, support arms 14 and optical elements 12 are suspended from the outer frame 16. To accomplish this, the outer frame is given the U shape already described and is provided with hubs 61 on the end of each arm of the U. These hubs are in alignment with each other and have a common axis which, when the instrument is leveled, lies substantially in a horizontal plane. As the hub axis is located transversely of the frame bracket 11, it will be appreciated that it is parallel to the axis about which the frame 11 is tipped. It should be further observed that the hub axis is positioned between slide 26 on the frame bracket 11 and the axis about which the latter may be adjusted. Under desirable construction practice, the outer frame 16 is given dimensions which will locate the axis of the hubs 61 at a distance below the highest point on the slide 26 of the frame bracket which will substantially equal the distance from the top of the average human head to the location of the horizontal axis of rotation for the eyes in such head.

The hubs 61 are employed for pivotally mounting the inner frame 17 which is of a shape similar to the U shaped outer frame 16 except that it is smaller so that it may be fitted within the outer frame to have its hubs 62 in alignment with the hubs 61 of the outer frame. Each outer frame hub has a bearing sleeve 63 secured therein by a set screw 64 as disclosed in Figure 1. Sleeves 63 provide means on which the hubs 62 of the inner frame are pivoted, each of these sleeves extending through one of these hubs. By making the inner frame of such a width that its hubs 62 abut the hubs 61 of the outer frame, it will be evident that the inner frame will be retained upon its pivot mounting.

Frames 16 and 17 are maintained in substantially the same plane for making far vision tests but for tests of near vision, it is desirable to move the inner frame out of such plane in order to compensate for movement of the eyes. To this end, the two frames are connected together at points midway between their hubs by a swivel rod which is fixedly secured to the outer frame but adjustably secured to the inner frame.

In effecting the just described connection, the base of a reading card bracket 65 is fixedly secured on the face of the inner frame 17 in centered relation between its hubs 62 by screws 66 as shown in Figures 5 and 6. Bracket 65 has two spaced apart arms 67 extending from its base. A swivel bearing 68 having suitable trunnions, is pivotally supported between these arms in the manner detailed in Figure 7. One trunnion of the swivel bearing is pivoted on the pivot screw 69 which extends through one arm 67 while a clamp screw 70, threaded into a boss on the other arm 67, is engaged by the other trunnion. The body of the swivel bearing 68 has a rod 71, known as the swivel rod, extending therethrough and slidably engaged thereby.

As best noted in Figures 3 and 7, rod 71 has its end adjacent to the frame 17 pivoted on a pivot pin 72 carried by suitable ears provided on a swivel bracket 73 secured to the frame 16 by screws 74 so that the center of the pivot pin is midway between the hubs of the outer frame. A suitable cutaway portion is provided in the housing 58 so that the swivel rod may extend therethrough. The rod 71 has its longitudinal axis so positioned that it lies in a plane which is substantially normal to the pivot axis of the inner frame while the inner end of the rod is pinned on an axis which is parallel to the pivot axis of the inner frame. By reason of this construction, the inner frame may be adjusted about the pivot axis of the bearing sleeves 63 and may be secured in a desired position upon engagement by the clamp shaft 70 which is actuated by the operating button 75.

Suitable stops such as the stop screw 76 engaged in the outer end of the swivel rod 71 and the pin 77 which extends through the rod 71 near the swivel bracket 73 are employed to control the movement of the inner frame. Stop 77 is located so that the inner and outer frame will be positioned substantially in the same plane when this stop is in contact with the swivel bearing 68.

The optical elements 12 comprise two similar sets of eye testing devices, each set being supported from the short leg of one of the L shaped arms 14. Each arm 14 is carried by the pivot mounting for the inner frame 17 and is separately adjustable along the pivot axis of the inner frame towards and away from the center of the instrument. For this purpose a bearing rod 78 having an internally threaded bore is slidably and rotatably mounted within each bearing sleeve 63 and has a portion thereof extending beyond one end of each sleeve. The other end of each bearing sleeve is closed except for an opening to permit a screw shaft 79, which is engaged in the bore of the bearing rod mounted within the sleeve, to extend through the opening which also serves as a support for the screw shaft.

An actuating button 80 is secured to the free end of each screw shaft 79 in such manner that it holds the fixed collar 81 on each screw shaft in contact with the inner side of the closure for its respective bearing sleeve. Movement of either bearing rod 78 in a desired direction along the pivot axis of the inner frame is obviously effected upon suitable rotation of the proper actuating button 80.

A hub 82 is formed on the long leg of each support arm 14 so that the arm may be mounted on a bearing rod 78 and pinned thereto, as shown in Figure 1, for movement therewith. The upper end of each arm 14 is bifurcated and is slidably engaged with a guide rod 83 which is suitably secured to the inner frame so that its longitudinal axis is substantially parallel to the pivot axis of the inner frame. A separate screw 84 extends through each branch of the bifurcated portion of each support arm 14, each pair of screws being slidably engaged with a guide rod 83. These screws act in the manner of adjustable gibs and avoid the necessity of accurately machining the forked end of each support arm for direct sliding engagement with a guide rod. Due to this construction expedient, tipping movement of the inner frame about its pivot axis will be transmitted to each arm 14 so that the latter will move in accordance with the movement of the inner frame.

While each bearing rod 78 will rotate in its sleeve 63 when the inner frame 17 is tipped, it is undesirable for the rods to be turned when their respective screw shafts 79 are rotated to adjust the positions of their respective support arms. In this regard, the guide rods 83 also serve to hold the bearing rods 78 against rotation while the latter are being adjusted in a lengthwise direction of themselves.

As the movement of the support arms 14 along the pivot axis of the inner frame is utilized to center each set of eye testing elements at the proper distance from the bridge of the nose, the pupillary distance for the patient may be determined from the separation of the support arms. Means for readily finding the pupillary distance makes use of an index on a plate 85 secured to each support arm and a separate scale for each index, each scale being formed on a separate plate 86 secured to the inner frame 17 adjacent a support arm 14 as shown in Figure 1.

In mounting each set of optical eye testing elements 12, a boss 87 is formed in the end of the short leg of each support arm 14 and has one end of a mounting rod 88 secured therein. Mounting rods 88 are supported so that their longitudinal axes lie in planes which are substantially normal to the pivot axis of the inner frame 17. Suitable cells or mounts 89, 90, 91 and 92, each designed to carry some type of eye testing accessory and each provided with a bracket having a hub, are pivotally mounted on each support rod 88 in the manner shown in Figures 1 and 5. Pins 93 are mounted in each rod 88 to extend in transverse relation thereto, one pin being located adjacent the hub of each mount for the optical elements. The purpose of the pins 93 is to maintain the hubs of the eye testing equipment mounts on their mounting rods 88 and also to act as stops for limiting the pivotal movement of the mounts. Conventional spring means, making use of resilient washers 94, are located between the hubs of each adjacent pair of mounts for the eye testing elements to urge each mount into firm contact with its stop pin 94.

Each set of optical eye testing elements may be comprised of a Maddox rod, cross cylinder, Risley prism and a test lens, these elements being respectively carried in the mounts 89, 90, 91 and 92. The mount 92 is a lens cell of the character which permits ready interchangeability of one trial lens for another. If desired, the cross cylinders may also be mounted in a manner which allows interchangeability.

Each of the mounts 89, 90, 91 and 92 is adapted to be separately rotated from its operative position as shown in Figure 1 to an inoperative position where it will lie adjacent to the short leg of its L shaped support 14 so it will not interfere with the eye test. The feature by which the optical elements are separately movable to inoperative positions allows the lens mounts 92 to be rotated to inoperative positions so that a test for muscle errors may be conducted while a patient is wearing his regular spectacle lenses.

The optical elements 12 of each set of eye testing accessories are positioned by their mounts so that they are in alignment and so that the optical axis of each set lies in a straight line which extends transversely of the frames 16 and 17 and intersects the pivot axis of the inner frame 17 at an angle which is substantially equal to 90°. When the frame bracket 11 and the frames 16 and 17 are positioned as shown in Figure 1 for the purpose of making a far vision test, the optical axes of the elements 12 lie in a substantially horizontal plane which passes through the pivot axis of the frame 17. Inasmuch as the optical elements 12 are connected to the frames 16 and 17 for rotation about the pivot axes of the frames, it will be apparent that tipping movement of the frames will be transmitted to the optical elements to incline their optical axes to the horizontal.

It is to be observed that the leveling of the instrument takes place about a center point which is located substantially midway between the eyes and which lies on the pivot axis of the inner frame 17. This allows the instrument to be leveled with a limited displacement of the trial lenses to one side or the other of the head and will in general avoid the necessity of relocating the phorometer before the eyes of a patient after it has been properly leveled.

In connection with centering the optical elements 12 at the correct distance from the nose, it is also to be noted that since they are carried by the arms 14, these elements 12 are separately movable towards or away from one another on rotation of the actuating buttons 80 so that they may be set at the correct pupillary distance apart.

As indicated by its name, the reading card bracket 65 is adapted to carry a reading card, the mounting rod for which is adapted to be engaged with the reading card support 95 so that the reading card may be moved with the inner frame 17. Support 95 is pivoted on a pivot screw 96 which is carried in bearings located at the end of the bracket 65 as shown in Figures 5 and 6. The cross bar 97, between the arms 67 of the reading card bracket, has a spring clip 98 secured thereto by screws or the like. Clip 98 in conjunction with a cross rod 99, which is also engaged between the arms 67 of the bracket, acts as a latch mechanism for releasably securing the reading card support in a vertical position when it is not in use. The inner frame 17 in addition to supporting a reading card may also serve as a support for a Stevens phorometer, suitable holes 100 being provided therein adjacent the base of the bracket 65 as shown in Figure 6 for the purpose of detachably supporting such auxiliary apparatus.

In considering the operation of the phorometer, it is desirable to keep in mind that when a person who is seated assumes a normal reading posture, it is necessary for him to move his head and also to move his eyes from their normal positions for distance vision. The movement of the head is its rotation or tipping about a horizontal axis which extends transversely of the head at the base of the skull. The movement of the eyes takes place about their horizontal axis of rotation and is an inward and downward rotational movement. A serious defect in prior art apparatus which leads to inaccurate eye tests has been its inability to allow a patient to assume a normal reading position when near point findings are being made.

As already indicated, an instrument of this character is suspended from a suitable standard and is located in front of the eyes of a patient, who is seated in a chair, so that the patient may look through the optical eye testing elements. To carry out a test, the instrument is raised or lowered with respect to its standard and is turned about its various support pivots, such as those provided for the arms 19 and 22, until the forehead rest 41 is properly placed against the patient's forehead. During these operations, the frame bracket 11 and the frames 16 and 17 are maintained in the positions shown in Figures 1 and 5 and in fact remain in such positions until the near point test is made.

The design features which permit the trial lenses and other testing elements to be adjusted for location in accordance with the individual needs of a patient are now utilized. To this end, each lens mount 92 is separately adjusted by actuation of its button 80 for the distance of the eye from the bridge of the nose so that the lens mounts will be set at the correct pupillary distance which may then be read from the scale means 86 and index means 85. Following this, the test lenses are adjusted for the proper distance in front of the eyes by suitable rotation of the button 39 to actuate the slide 35 and cause forward or backward movement of the test lenses with respect to the eyes.

When the lens cells 92 are set at the proper pupillary distance and at the correct distance in front of the eyes, the other eye testing elements carried in the mounting rods 88 will also be correctly positioned and all of the optical elements may be centered for elevation by moving the entire instrument up or down on its stand. Should it now be found that the interpupillary line is not horizontal, the phorometer may be rotated about its tilt axis by actuation of the leveling button 54 until the level 60 indicates that the instrument has been suitably leveled. These last described operations complete the adjustment of the instrument for a far vision test which may now be conducted in the usual manner.

When the refractionist is ready to take the near point test, assuming that the instrument is adjusted before the patient's face as already described, the clamp 28 is loosened and the frame bracket 11 is tipped forwardly about its arcuate track, that is to say away from the head of the patient. The patient is instructed to tip his head and to follow the forehead rest with his forehead as the instrument is tipped in its arc. This arcuate movement of the phorometer will tip the optical elements 12 and while permitting the patient to assume a normal reading position will also compensate for the normal head movement which occurs with such posture by maintaining the elements 12 in centered relation to the head in a manner similar to that in which spectacle lenses are carried by the head in its movement for reading purposes.

The instrument is generally designed so that the extreme forward position of the frame bracket 11 will take care of the usual conditions encountered in testing. Of course, if desired, the frame bracket 11 may be clamped at any position on its arc and for that matter, a longer arc than that shown may be used with the instrument.

While the just described tipping action will compensate for movement of the patient's head and to this end will tip both frames 16 and 17 by like amounts, a further inclination of the optical elements is desirable to care for the accompanying downward and inward rotation of the eyes. The correction for the eye movement is made by loosening the clamp 75 and swinging the inner frame 17 forwardly about its bearing sleeves 63 which are positioned to provide a substantially horizontal axis parallel to the axis of the head movement but located above it to extend substantially through the eyes of the patient. When the inner frame 17 has been pivoted about its axis until the optical elements are properly centered to care for the eye movement, the clamp 75 may be used to secure the frame in its adjusted position. The instrument is now ready for conducting the near point test which is taken in the usual manner.

It is to be noted that as the reading card support 95 is carried by the inner frame 17, any reading card attached thereto will be moved with the inner frame as it is tipped for head and eye movements. This permits a reading card to be held in a position for near vision at a location in which a patient will normally hold a book for reading purposes.

While the preferred embodiment of the invention has been illustrated, it is apparent that many modifications may be made therein by those skilled in the art. For example, the invention lends itself to the production of a line of instruments which range from the described phorometer to an instrument which is provided with only certain of the testing refinements herein illustrated. In this connection, the guide block 30 and slide member 35 may be dispensed with and the connection member 42 secured to the frame bracket 11, although such expedient will be accompanied by the loss of the adjustment for distance of the optical elements before the eyes. Similarly by giving up the tipping movement of the elements 12 designed to care for the rotation of the eyes, the inner frame 17 may be eliminated and the support arms 14 while carried on the same pivot axis may be connected to the outer frame 16. For that matter, a combination of both of these modifications can be readily made. Obviously, changes of the character herein mentioned will not depart from the underlying principles of the apparatus and are comprehensive of the scope of the invention.

By use of a phorometer which permits the optical testing elements to follow the head and eye movements of a patient, it will be apparent that an instrument has been devised which will permit vision tests to be made with great accuracy. In addition to the many other novel features by which the aims and objects of the invention are attained, it may in general be noted that due to its simple design there is provided an instrument which may be embodied in a sturdy structure of a nature which is characterized by easy operation and ready adjustment.

We claim:

1. An ophthalmological instrument comprising a support, a bracket, said support having arcuate shaped guide means of substantially constant radius extending in lengthwise direction of the support, slide means on said bracket cooperating with said guide means whereby said bracket is adjustably slidable on said support in an arcuate path of substantially constant radius, a frame secured to said bracket for movement therewith, said frame carried by said bracket to extend transversely thereof, and optical eye testing elements supported by said frame for movement therewith, said optical elements located near the extremities of said frame and supported to have their optical axes extend in transverse relation to said frame.

2. A phorometer comprising a support, a bracket, said support and bracket having substantially rigid arcuate shaped cooperating guide and slide means extending in a lengthwise direction of the support and bracket whereby said bracket is adjustably mounted on said support for movement in an arcuate path of substantially constant radius, said arcuate path having an arcuate length at least equal to the length of the arcuate path through which the head of an average person is moved from a normal position for far vision to a normal position assumed for reading, the radius of said arcuate path being of a length which approximates the distance from the top of the average human head to an axis about which the head tips when assuming a reading position, a frame secured to said bracket for arcuate movement therewith, said frame located with respect to said bracket and support to extend transversely thereof, an optical eye testing elements through which a patient looks while undergoing test, said optical elements carried by said frame in adjacent relation to each other so that one eye can look through certain of said optical elements while the other eye can look through other of said optical elements, the optical elements being supported to have their optical axes extend in transverse relation to said frame.

3. A phorometer comprising a support, a bracket, said support and bracket having substantially rigid arcuate shaped cooperating guide and slide means extending lengthwise of said support and bracket whereby said bracket is adjustably slidable on said support for arcuate tipping movement in an arcuate path of substantially constant radius about a substantially horizontal axis which is located to substantially coincide with the axis about which an average person, who is undergoing test, tips his head when assuming a reading posture, a frame carried by said bracket for arcuate movement in accordance with the arcuate tipping movement of the bracket, said frame being slidably secured to said bracket by guide means whereby the frame is adjustably tiltable in an arcuate path about an axis which extends transversely of the axis of the tipping movement and which lies in a substantially horizontal plane when said frame is adjusted about said tipping axis to lie in a substantially vertical plane, and optical eye testing elements for each eye of a patient undergoing test, said optical elements carried by said frame for movement in accordance with the movement thereof.

4. An ophthalmological instrument comprising a support, a bracket, said support and bracket having cooperating arcuate shaped guide and slide means extending in lengthwise direction of the support and bracket whereby said bracket is adjustably slidable on said support for arcuate tipping movement in a path of substantially constant radius about a substantially horizontal axis which is located to substantially coincide with the axis about which an average person, who is undergoing test, tips his head when assuming a reading posture, adjustable slidable means carried by said bracket to move in accordance therewith and to be independently adjustable thereof in a straight line direction extending lengthwise of the bracket, a frame, guide means cooperating with said adjustable slidable means carried by said bracket whereby the frame may be adjustably tilted with respect to the bracket in an arcuate path about an axis which extends transversely of the axis of the tipping movement and which lies in a substantially horizontal plane when said frame is adjusted about said tipping axis to lie in a substantially vertical plane, and optical eye testing elements for each eye of a patient undergoing test, said optical elements carried by said frame for movement in accordance therewith.

5. Eye testing apparatus comprising a support, a bracket, said bracket adjustably mounted on said support for arcuate movement in a path of substantially constant radius about a substantially horizontal axis which is located to substantially coincide with the axis about which an average person, who is undergoing test, tips his head when assuming a reading posture, an outer frame and an inner frame carried from said bracket for movement in accordance with the movement of the bracket, said inner frame surrounded by said outer frame and supported therefrom for adjustable pivotal movement which is independent of the arcuate movement of said bracket but which is about an axis substantially parallel to the axis of the arcuate movement of the bracket, optical eye testing elements through which a patient looks, and mounting means for supporting said optical elements for movement in accordance with the movements of said frames, said mounting means for the optical elements being pivoted to the outer frame and secured to the inner frame.

6. Eye testing apparatus comprising a support, a bracket, said bracket being adjustably mounted on said support for arcuate movement in a path of substantially constant radius about a substantially horizontal axis which is located to substantially coincide with the axis about which an average person, who is being tested by the apparatus, tips his head to assume a reading posture, an outer frame supported by said bracket for arcuate movement therewith, an inner frame located within the outer frame, means pivotally supporting the inner frame on the outer frame for pivotal movement about a substantially horizontal axis which is substantially parallel to said first mentioned axis, connecting means securing one frame to the other for permitting said frames to be held together for simultaneous arcuate movement in accordance with the arcuate movement of said bracket and for permitting the inner frame to be moved independently of the outer frame about its pivot means to a desired position and to be held in such position, optical eye testing elements through which a patient looks, support means for said optical elements, said support means carried by the pivot means for the inner frame for movement about said pivot means and also connected to said inner frame whereby movements of said frames will be imparted to said optical elements.

7. An ophthalmological instrument comprising a support, a bracket, said support having arcuate shaped guide means of substantially constant radius extending in lengthwise direction of the support, a slide on said bracket cooperating with said guide means whereby said bracket is adjustably slidable on said support in an arcuate path of substantially constant radius and having its axis of curvature located approximately at the base of the skull of the person whose eyes are being tested, a frame secured to said bracket for movement therewith, said frame carried by said bracket to extend transversely thereof, and optical eye-testing elements supported by said frame for movement therewith.

FREDERICK W. JOBE.
RAYMOND F. E. STEGEMAN.